Figure 1:
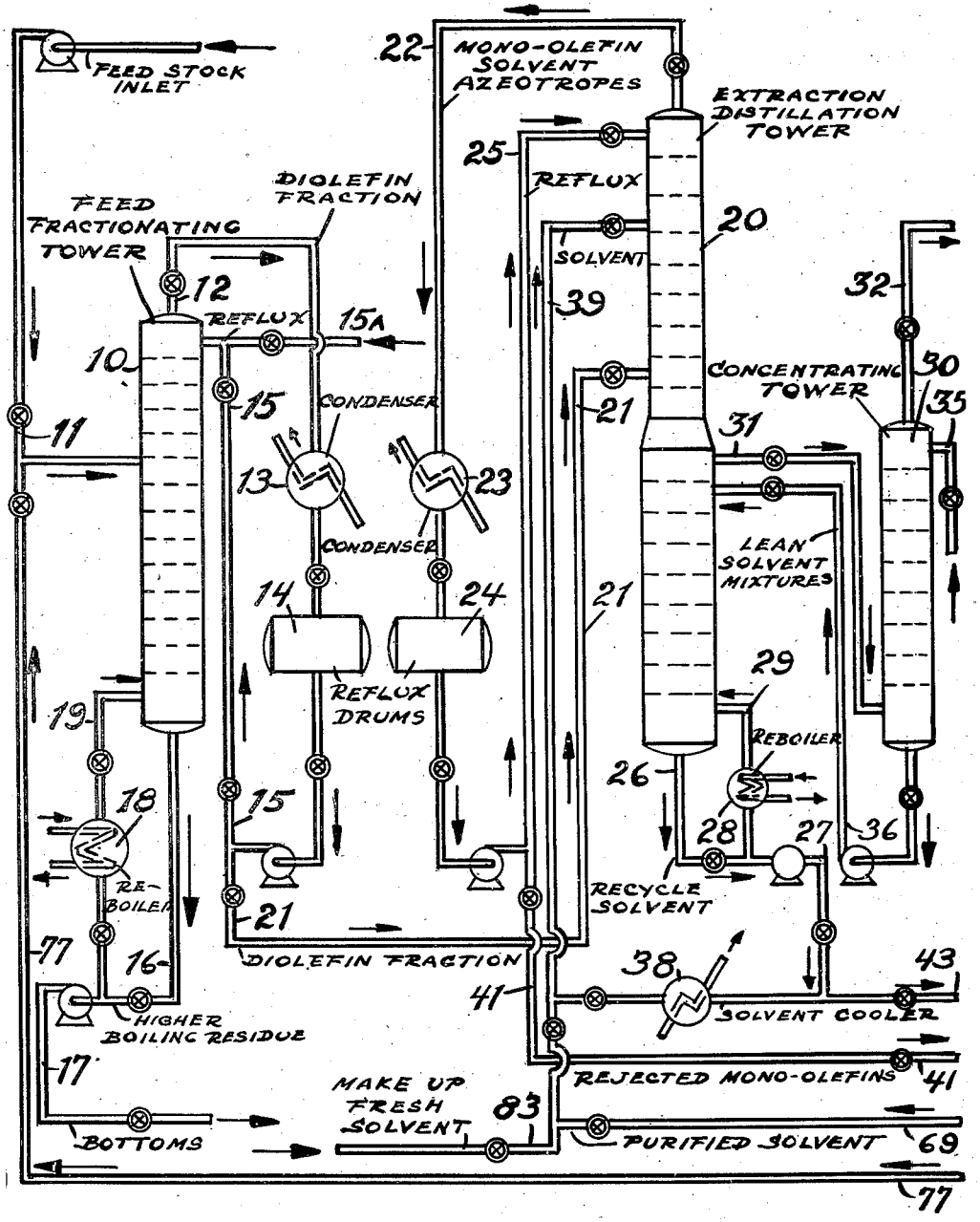

Patented Sept. 24, 1946

2,407,997

UNITED STATES PATENT OFFICE 2,407,997

SEPARATION AND PURIFICATION OF ISOPRENE

John A. Patterson, Westfield, N. J., assignor to Standard Oil Development Company, a corporation of Delaware Application August 17, 1943, Serial No. 498,944

2 Claims. (Cl. 202—41)

This invention relates to the treatment of mixtures of hydrocarbons of the $C_3$ to $C_8$ range to effect segregation and purification of paraffins, mono-olefins and diolefins. The invention relates particularly to the separation of diolefins containing 5 carbon atoms in the molecule from their admixture with other hydrocarbons in products of the treatment of petroleum fractions; and also the purification of diolefins.

The extraction of individual $C_4$ and $C_5$ hydrocarbons from easily available sources is beset with many difficulties because of the low concentrations involved and the interrelated properties of these hydrocarbons in such supplies. Thus, the hydrocarbons containing 5 carbon atoms in the molecule have boiling points at 760 mm. and relative volatilities, $\alpha$ as follows:

|  | ° C. | $\alpha$ |
|---|---|---|
| 3-methyl butene-1 | 21.2 | 1.52 |
| Pentene-1 | 30.2 | 1.06 |
| 2-methyl butene-1 | 21.1 | 1.03 |
| Isoprene | 34.1 | 1.00 |
| Trans-pentene-2 | 35.9 | 0.93 |
| n-Pentane | 36.0 | 0.92 |
| Cis-pentene-2 | 37.0 | 0.91 |
| Trimethylethylene | 38.4 | 0.88 |
| Cyclopentadiene | 41.0 | 0.83 |
| Trans-piperylene | 41.9 | 0.77 |
| Cis-piperylene | 43.9 | 0.75 |
| Cyclopentene | 44.1 | 0.73 |
| Cyclopentane | 49.5 | 0.67 |

The boiling points and the relative volatilities of the various $C_5$ compounds clearly do not follow the degree of chemical unsaturation of the compounds. Even to effect separation upon the basis of normal vapor pressure, of a simple from a complex mixture would also clearly require extremely expensive equipment. Moreover, if a fractional distillation were to be made upon a general mixture of $C_5$ hydrocarbons to separate close boiling fractions, prolonged heat under high reflux ratios would be required and under such conditions considerable polymerization of the more unsaturated hydrocarbons would occur. Thus, fractional distillation alone as a means of making a separation of hydrocarbon from complex mixtures is disadvantageous, even in the laboratory.

In a co-pending application, Serial No. 470,426, filed December 29, 1942, it was disclosed that complex hydrocarbon mixtures could be advantageously resolved into their individual constituents by a unique combination of at least three processing steps. In two of the three steps fractional distillation is employed. Between the two fractional distillation steps is effected an extractive distillation. The process of that invention is thus the combination of a carefully controlled fractional distillation of a suitable feed stock followed by an extractive distillation of a particular distillate fraction and then subsequently fractionally distilling one of the particular distillate fractions from the extractive distillation operation. Invention was stated to reside not only in the combination of the fractional distillation steps with extractive distillation, but also in the particular manner of combination in order to achieve particularly desirable fractions for the second and third steps in the processing, namely, for the extractive distillation and the second fractional distillation steps. It was stated also in Serial No. 470,426 that in commercial operation it was usual to employ a fourth step, namely, the recovery of the solvent employed in the extractive distillation step. Such a step is, however, incidental rather than an essential feature of the process of the invention.

Thus, according to the process disclosed in application Serial No. 470,426, the concentration of $C_5$ diolefins was effected by supplying the system with a feed stock consisting of a narrow $C_5$ cut as rich as possible in the desired diolefin, isoprene for example. A debutanized aromatic distillate containing 4% of isoprene was fractionally distilled in a 50 plate tower with a reflux ratio of from 5 to 10, depending on the nature of the feed stock, and a product was had containing from 15% to 25% of isoprene. Such fractional distillation failed to remove some of the hydrocarbons most difficult to separate in the subsequent extractive distillation. In the extractive distillation with aqueous acetone as the solvent, trimethylethylene which has a normal volatility relative to isoprene of 0.88, has a volatility index $\alpha$ relative to isoprene of 1.23. Thus in both the fractional and extractive distillation systems isoprene and trimethylethylene have about the same spread. The present invention overcomes this deficiency.

It has now been found that by substituting in the processing disclosed in application Serial No. 470,426, an azeotropic distillation step for the first fractional distillation step, concentration of the desired diolefins may be easily effected and distinction also made between hydrocarbons otherwise difficult to separate by fractional and extractive distillations either alone or in combination. By adding a controlled quantity of a third liquid or solvent to the feed fractionating tower so that the distillate will consist of azeotropic mixtures, separation can easily be effected of many different hydrocarbons. Thus, in mixtures containing isoprene and trimethylethylene in association with other $C_4$ and $C_5$ hydrocarbons and employing aqueous acetone as the solvent, there is formed a ternary azeotrope of isoprene, acetone and water of lower boiling point than that of any other $C_5$ hydrocarbon usually present in such a mixture with the exception of pentene-1 which is otherwise easy to separate from isoprene. The volatility of trimethylethylene relative to isoprene is depressed, making otherwise difficult separation relatively easy. Since pentene-1 has a normal volatility greater than that of isoprene, the separation of this and lighter hydrocarbons is easily effected in the subsequent extractive distillation step disclosed in application Serial No. 470,426. The following table gives the average relative volatilities of the various compounds in azeotropic distillation:

| Component | Relative volatility at 25 lbs./sq. in. gauge | | |
|---|---|---|---|
| | Normal distillation | Azeotropic distillation | Extractive distillation |
| Pentene-1 | 1.06 | 1.12 | 1.36 |
| Isoprene | 1.00 | 1.00 | 1.00 |
| Trimethylethylene | .88 | .78 | 1.23 |

In order to furnish a better basis for appreciating the invention, analysis of the processing in each of the essential steps is presented. In fractional distillation, separation of the constituents of a mixture is made upon the basis of differences at varying temperatures of the vapor pressures of the various compounds when in admixture one with the other. In extractive distillation and azeotropic distillation, on the other hand, separation of the constituents in the mixture is based on the differences at different temperatures of the vapor pressures of selected groups of compounds in the presence of certain types liquids added to a fractional distillation system.

The presence of suitable liquids in extractive distillation and azeotropic distillation effects in different degrees positive deviations from Raoult's law; that is, the volatilities of the various compounds are greater in the presence of the added liquid than would be expected upon the basis of their normal vapor pressures. Thus, in the case of a hydrocarbon mixture containing paraffins, mono-olefins and diolefins, the added liquid modifies in different degrees the relative volatilities of the various type hydrocarbons. In an extractive distillation upon a narrow-boiling fraction with a polar type solvent, the paraffins will be the most volatile constituents; the mono-olefins less volatile; and the diolefins the least volatile. Thus, the following table indicates the relative volatility values of four $C_5$ hydrocarbons in the presence and absence of aqueous acetone:

| | No solvent | With 2 volumes of aqueous acetone |
|---|---|---|
| Isoprene | 1.00 | 1.00 |
| n-Pentane | 0.92 | 1.43 |
| Pentene-2 (trans) | 0.92 | 1.30 |
| Trimethylethylene | 0.88 | 1.26 |
| Cyclopentene | 0.71 | 0.95 |

It is such an effect under suitable conditions of pressure and concentration of the added liquid that contributes to the formation of azeotropic compositions.

The added liquid in extractive distillation is employed in greater amounts than in azeotropic distillation in order that the maximum effect of the solvent may be exercised upon the different groups of compounds; that is, the amount of extraneous liquid employed in an extractive distillation is greatly in excess of that which would form azeotropic mixtures in the system. Thus, the addition of an extraneous liquid in extractive distillation is related to, but very distinct from, the addition of a definite amount of the added liquid in an azeotropic distillation system.

Liquids suitable in extractive distillation are in general the stable organic liquids of high dielectric constant. The suitable materials are therefore the normally liquid polar organic compounds containing oxygen, nitrogen, sulfur and related elements. Suitable liquids also have the following characteristics:

(1) High solubility for the hydrocarbons;
(2) Marked effect on the relative volatility;
(3) Readily separable from the hydrocarbons by distillation or when azeotropes are formed by solvent extraction or other means;
(4) Sufficient volatility to permit stripping without requiring the use of high temperatures;
(5) Comparative stability when heated in the presence of hydrocarbons; and
(6) Commercial availability and non-corrosiveness.

In the case of the separation of the $C_5$ hydrocarbons from their admixture with other hydrocarbons, acetone, furfural, pyridine, the amines and their admixtures with water have been found to be particularly advantageous.

In the case of azeotropic distillation the same type of liquids are suitable as solvents. In addition, however, the liquids should have the following characteristics:

(1) Ability to form minimum boiling azeotropes with the desired hydrocarbons;
(2) Readily separable from the hydrocarbons;
(3) Sufficient difference in volatility between the solvent and the azeotropes;
(4) Comparative stability when heated in the presence of hydrocarbons; and
(5) Commercial availability and non-corrosiveness.

Suitable liquids therefore for azeotropic distillation are the saturated ketones, the amines, the alcohols and their admixture with water.

It will thus be noted that liquids advantageous as solvents in both extractive and azeotropic distillation systems have very closely related properties and that, in general, liquids suitable for one type of distillation are also suitable for the other type of distillation. The employment of azeotropic mixtures as a means of extraction of the desired hydrocarbons provides the basis for the separation of compounds otherwise difficult, and advantages in over-all processing, especially when the same liquid is employed in the azeotropic and extractive distillation systems. The particular processing advantages will be evident from the further description and illustration of the invention.

Taking the separation of isoprene as a suitable example of the process of this invention, the first step involves the azeotropic distillation of a narrow $C_5$ hydrocarbon fraction containing a substantial amount of isoprene and rejecting as much as possible of the piperylene, cyclopentadiene, trimethylethylene and the pentenes. A suitable source for isoprene is the refinery by-product distillate from the high temperature cracking of gas oil, virgin naphtha, kerosene and/or other suitable feed stocks. A typical debutanized stock from this source may contain about 4% isoprene.

A stock of this nature is distilled in the presence of an entrainer so as to separate as a distillate, essentially all of the desired hydrocarbons as constituents of azeotropic mixtures and as residue, undesirable hydrocarbons of $C_5$ content and of higher boiling points. Aqueous acetone is usually employed as the entrainer in the separation of $C_5$ hydrocarbons containing a high percentage of isoprene but any of the lower saturated ketones, the amines, the alcohols, either alone or in admixture with water, may be employed. In this azeotropic distillation step, a distillate containing as high a content of isoprene as is consistent with the feed stock is usually obtained. The residue contains a substantial quantity of such undesirable $C_5$ hydrocarbons as trimethylethylene and cyclopentadiene and the higher boiling $C_5$ hydrocarbons in association with hydrocarbons of the $C_5+$ molecular content.

The distillate material is then subjected to an extractive distillation in the presence of an added amount of a solvent liquid which affects in different degrees the relative volatilities of the various type hydrocarbons. For this purpose usually the same liquid as in the azeotropic distillation is employed since the liquid is largely selected on this basis; for example, aqueous acetone in the extraction of isoprene from close-cut $C_5$ hydrocarbon fractions. Other organic liquids such as acetone itself, furfural, the liquid basic nitrogen compounds such as pyridine and the amines and mixtures thereof with water, may also be advantageously used. In the case of aqueous acetone as the added liquid, the total amount employed is usually about twice the volume of the liquid hydrocarbon mixture flowing down through the distillation tower; in the case of furfural, the ratio is as high as 7 to 1.

When different added liquids are used in the azeotropic and extractive distillation operations, separation of the added liquid from the azeotropic distillate is necessary prior to subjecting the distillate product to extractive distillation. This may be accomplished by extraction with water or other known means. The use of different added liquids has the disadvantage of necessitating separate recovery systems for each liquid. The gain in product purity and saving in heat expenditure make this method of operation economically advantageous in some cases.

Thus, under suitably controlled conditions in the presence of such quantities of added liquid, such as aqueous acetone, a vapor overhead product is obtained from the extractive distillation system which consists essentially of paraffins and monoolefins of $C_5$ molecular content. The residue which is usually obtained consists essentially of solvent which is recycled to the proper point in the tower to maintain as high a solvent to hydrocarbon ratio as is advantageous for the process. The most important fraction removed from the system is the intermediate distillate material conveniently termed the side-stream product. This side-stream product consists mainly of isoprene with a lesser amount of piperylene and such traces of liquid polymer products as were formed during the distillation operations. Both the overhead and side-stream distillate fractions may contain substantial quantities of the added liquid—that is, aqueous acetone in this case—as a result of the formation of azeotropic mixtures.

The side-stream product from the extractive distillation operation is normally treated to effect the separation of the liquid added in the azeotropic and extractive distillation operations. When aqueous acetone is employed as the added liquid, the side-stream product is usually countercurrently treated with water to remove the acetone, and thus to permit the isoprene and other hydrocarbons to be separated therefrom. The hydrocarbon material after the separation of the added liquid is then fractionally distilled under carefully controlled conditions to obtain as an overhead product one of the hydrocarbons in substantial purity. In the present case the fractional distillation is effected to obtain substantially pure isoprene as the overhead product; and to leave as distillation residue the piperylenes, and cyclopentadiene not previously removed due to the presence in the system of pentanes, and smaller quantities of other impurities.

Since some polymerization may occur during the azeotropic and extractive distillation steps, high-boiling polymeric materials are normally present in the solvent recycle. In order to maintain the polymer content of the solvent at a low value, usually about 3% to 5% of the recycle solvent stock is removed and combined with the overhead distillate obtained from the extractive distillation; and the combined stream is then treated for solvent recovery.

In order to illustrate the invention more clearly, the following detailed description of processing is presented. The reference numerals given in the description refer to the accompanying drawings which present a suitable lay-out of equipment, and indicates a suitable flow of materials for processing according to the invention. In this illustration, example will be taken of the separation and purification of isoprene as obtained from the treatment of a debutanized distillate stream from a liquid phase cracking of a virgin gas oil stock. A specific example of a typical debutanized distillate stream has the following molar percentage composition:

| | |
|---|---:|
| Butenes | 0.5 |
| 3-methyl butene-1 | 0.5 |
| Pentene-1 | 9.4 |
| 2-methyl butene-1 | 2.0 |
| Isoprene | 4.1 |
| Trans pentene-2 | 1.0 |
| N-pentane | 0.8 |
| Cis pentene-2 | 1.0 |
| 2-methyl-butene-2 | 2.2 |
| Cyclopentadiene | 1.3 |
| Trans piperylene | } 2.9 |
| Cis piperylene | |
| Cyclopentene | 2.1 |
| Cyclopentane | 0.1 |
| $C_6$ | 11.7 |
| $C_6$ aromatics | 11.7 |
| $C_7$ | 18.7 |
| $C_8$ | 9.8 |
| $C_9$ | 20.2 |

The feed stock is supplied to fractionating equipment 10 (Figure 1) through line 11. The fractionating equipment 10 may be any of the usual types, such as a fractionating tower containing bubble plates. The equipment is usually operated at about atmospheric or somewhat above atmospheric pressure. In the diagram, equipment 10 is specifically shown as being a tower of multi-plate construction containing bubble cap plates. In normal operation of processing according to the invention, about 50 plates are present in such a tower. The tower is shown as being complete with an overhead vapor line 12, a condenser 13, a reflux drum 14, a reflux line 15, a bottoms line 16, a reboiler 18, reboiler vapor line 19, and an entrainer supply line 15A. The distillate product is withdrawn from the distillation system through line 21 and the bottoms product from the system through line 17. The amount of entrainer liquid supplied to the system through line 15A is dependent upon the content of isoprene in the feed stock so as to form therewith the azeotropic composition but insufficient in amount to form with an azeotropic composition with trimethylethylene, that is in this case about one volume of aqueous acetone to ten volumes of the feed stock.

The pressure upon the system for the treatment of the specific composition is maintained about 25 lbs. per sq. in. (gauge), in order to be able to employ ordinary water for cooling purposes in the condenser 13. The degree of separation in tower 10 is controlled by the heat supply from the reboiler 18 and the ratio of reflux supplied through line 15. The percentage of the feed taken off as product through line 21 is adjusted so as to take the major portion of the isoprene in this fraction while rejecting almost all of the trimethylethylene and most of the piperylene and pentenes in the residue. In the example used for illustration, a reflux ratio of 5 is maintained while taking off approximately 6% to 7% of the feed as distillate product. Under these conditions, the temperature at the top of the tower is 140° F., while the temperature at the exit of the line 17 is about 275° F.

The overhead product removed through line 12 contains almost all the aqueous acetone added through line 15A together with the majority of the isoprene and some of the piperylene in the mixture, some of the pentene-1 and traces of other C₅ olefins and paraffins as azeotropic mixtures formed between the constituents of the original hydrocarbon mixture. In this distillate the azeotrope containing isoprene contains 92.0% isoprene, 7.6% acetone and 0.4% water. Isoprene is thus distilled at a temperature 3° to 4° F. below its own boiling temperature thereby minimizing heat effects productive of polymer formation. Moreover, as a result of the high concentration of the isoprene in the distillate material, a smaller quantity of distillate is taken off as compared to straight fractional distillation, thus effecting considerable heat and processing economies. The heat economy involved more than compensates for the heat input required for distillation of the added aqueous acetone.

The entire distillate is condensed in equipment 13 and passed to the drum 14. From the drum 14, a quantity of reflux is passed through line 15 in order to maintain the desired operating conditions. The remainder of the condensed distillate is withdrawn from the drum 14 and passed through line 21 for further processing. The ratio of the reflux to product is between 4 and 5, depending upon the feed. In the processing of the feed stock of the specific illustration, the composition of the distillate material under the specific operating conditions given shows the following molar percentage composition:

| | |
|---|---|
| C₄ | 7.8 |
| 3-methyl butene-1 | 1.5 |
| Pentene-1 | 6.0 |
| 2-methyl butene-1 | 3.0 |
| Isoprene | 59.9 |
| Trans pentene-2 | 1.5 |
| n-Pentane | 3.0 |
| Cis pentene-2 | 1.5 |
| 2-methyl butene-2 | 3.0 |
| Cyclopentadiene | 1.8 |
| Cis and trans piperylene | 0.9 |
| Acetone | 8.8 |
| Water | 1.3 |
| | 100.0 |

The residual material containing the trimethylethylene, the piperylene, normal pentane, some pentenes, and some isoprene in addition to higher boiling hydrocarbons, is withdrawn through line 16. A portion of the residue is passed through the reboiler 18 where it is vaporized in order to supply the heat necessary to operate the tower, the vapor being returned to the tower 10 through line 19. The remainder of the higher boiling material is removed from the system through line 17.

The overhead fraction from tower 10 as removed through line 21 is passed to the fractionating tower 20. The tower 20 is similar in design to tower 10 and may be any type of suitable fractionating equipment. The tower 20, however, is of smaller dimensions than the corresponding tower employed when fractional distillation is used in the preparation of the feed material such as in the processing disclosed in the copending application, Serial No. 470,426. The reduced size of the tower 20 is occasioned by the smaller amount of the distillate and the higher concentration therein of the desired hydrocarbons in the feed supply to the extractive distillation system than when fractional distillation is employed in the tower 10. It is furnished with an overhead vapor line 22, a condenser 23, a reflux drum 24, a reflux line 25, a bottoms line 26, a reboiler 28 and a reboiler vapor return line 29. The tower also has a solvent line 39, a side stream vapor line 31 and a side stream return line 36. The distillate product is withdrawn from the system through line 41 and the bottoms product through line 27. The pressure upon the system is maintained at about 25 lbs. per sq. in. (gauge), in order to have a workable condensing temperature similar to that prevailing in the fractionating equipment 10.

Figure 1A:
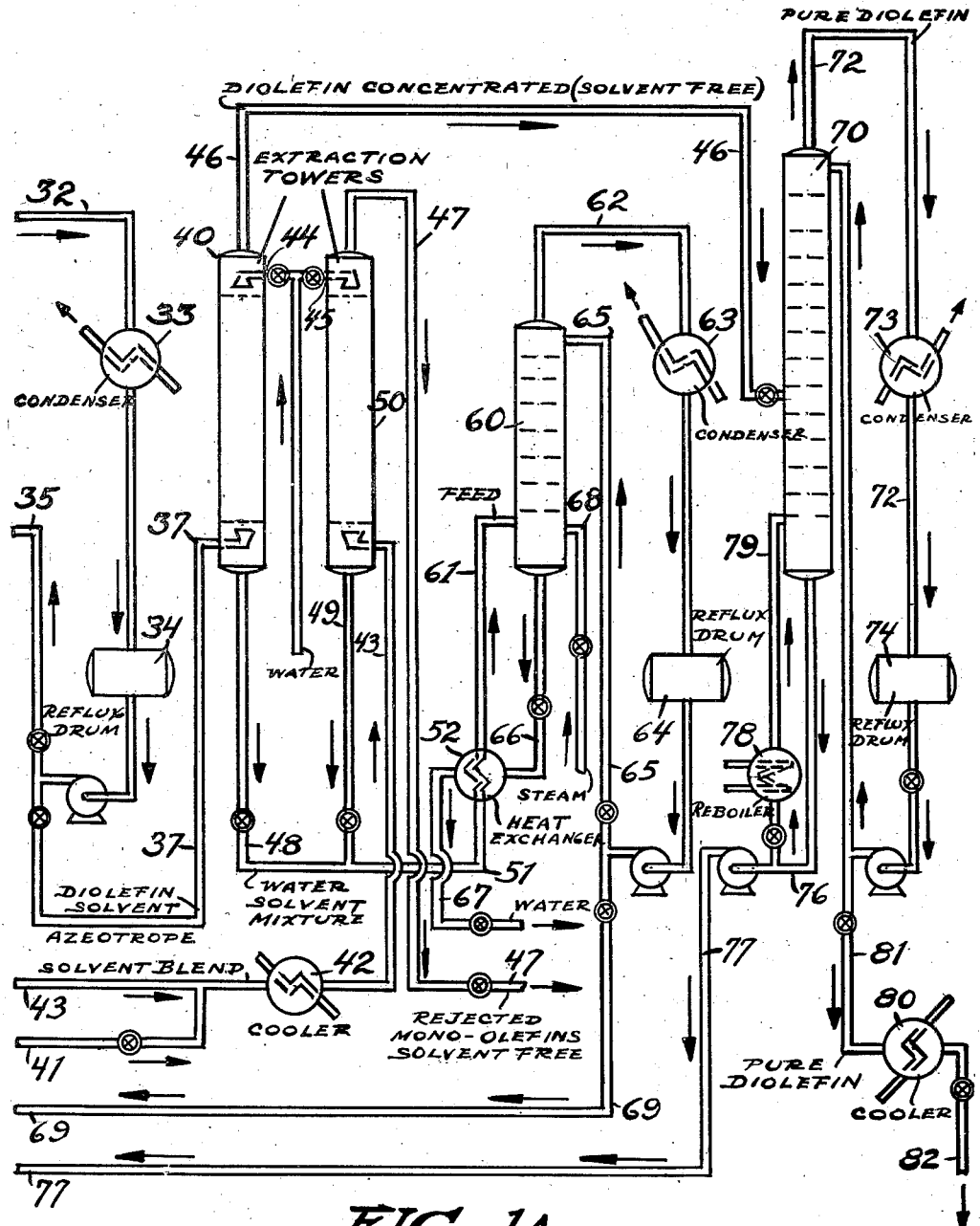

The overhead distillate vapor removed through line 22 consists of azeotropic mixtures of C₅ olefins and paraffins when aqueous acetone is employed as the solvent material admitted through line 39. The vapors are condensed in equipment 23 and passed to the reflux drum 24. A portion of the condensate is returned through line 25 as reflux, while the remainder is withdrawn through line 41, cooled in equipment 42 (Figure 1A) and conducted through line 43 to the water scrubbing equipment 50.

The quantity of aqueous acetone admitted through line 39 to the extractive distillation system is for the amount and composition of feed supply in a volume ratio of solvent to azeotropic mixture of 2–1 from the point of introduction to the plate upon which the side stream is withdrawn. Below the plate from which the side stream product is withdrawn, the solvent is stripped of its hydrocarbon content.

The bottoms withdrawn through line 26 consist of relatively pure solvent. A portion of the bottoms liquid is passed through the reboiler 28 where it is vaporized, the vapors being returned to the tower 20 through the vapor line 29, to supply the heat necessary to operate the tower. The remainder of the solvent, except for a small portion withdrawn for purification, as to be further described, is conducted through line 27 to cooler 38 and then through line 39 to the upper portion of the tower 20. Thus, the major part of the solvent continuously recycles within the extractive distillation system.

The vapor side stream removed through line 31 contains a high concentration of isoprene with small amounts of other diolefins in the presence of solvent in an amount in equilibrium with a 75 molar percent concentration of solvent on the plates of the extractive distillation tower 20. The volume of the solvent is about 50% of the vapor mixture. This side stream material withdrawn through line 31 is conducted to the base of the side stream concentrating tower 30. The tower 30 may be any suitable fractionating apparatus, such as a tower provided with bubble plates, as previously employed. The tower is provided with an overhead vapor line 32, a condenser 33, a reflux drum 34, a reflux line 35 and a bottoms line 36, in addition to the vapor inlet line 31. The vapor entering the tower 30 through line 31 supplies the heat necessary to operate the tower.

The overhead distillate removed through line 32 consists essentially of the azeotropic mixture of isoprene, acetone and water and contains in addition small quantities of other $C_5$ unsaturates and higher boiling materials such as polymers formed during the extractive distillation operation. The vapor is condensed in equipment 33 and conducted to the drum 34. A portion of the condensate is returned to the tower 30 through line 35 as reflux, while the remainder is withdrawn through line 37 to the water scrubbing equipment 40.

The degree of separation of the hydrocarbons taking place in the extractive distillation system 20 is dependent on two functions, namely, the ratio of the solvent to hydrocarbon liquid on the plates and the ratio of liquid to vapor flowing through the tower. The ratio of solvent to hydrocarbon is controlled by the rate of solvent recirculation. The ratio of liquid to vapor in the zone of high solvent to hydrocarbon ratio, that is, between the solvent inlet and the side stream outlet, is controlled by the reflux returned through line 25 from the reflux drum 24. Due to considerable difference in solvent concentration between the top of the tower and the extractive distillation zone and the difference in latent heats of the constituents, the reflux ratio and consequently the ratio of liquid to vapor at the top of the tower must be appreciably higher than the liquid to vapor ratio in the extractive distillation zone.

In the case of the specific example, the liquid to vapor ratio in the extractive distillation zone is 0.80, while the ratio at the top of the tower is 0.85, the latter being equivalent to a reflux ratio of 5.5. The reflux ratio used in the side stream tower 30 is adjusted so as to obtain an overhead product consisting essentially of the azeotropic mixture of isoprene, acetone and water and to supply adequate reflux to the solvent stripping section of the tower 20; whichever requires the larger amount of reflux determines the reflux ratio at the top of the tower 30. In the case cited in the example, a reflux ratio of 20 is maintained at the top of the tower 30, in order to supply adequate reflux to the bottoms solvent stripping section of the tower 20.

The heat necessary for the extractive distillation operation, as well as to concentrate the hydrocarbon fractions and to strip the solvent, is supplied completely from the single reboiler 28. In this manner, considerable heat economy is effected, since the heat to operate the extractive distillation zone in tower 20 and the diolefin concentrating side stream tower 30 are supplied by condensation of the solvent mixture at the top of the solvent stripping section of the tower. If this were not done, a condenser would have to be provided for the solvent stripper to supply the reflux necessary for operation, and additional heat would be required to operate the extractive distillation system and to effect the side stream concentration. In the same way, the condensation needed to produce the required reflux in the extractive distillation zone is obtained by supplying the heat needed to concentrate the monoolefins at the top of the tower 20.

In the operation of the system comprising towers 20 and 30 and their auxiliaries, separation into the zones indicated above is clearly defined by the various temperature zones. Thus, the vapor leaving the top of the tower 20 is at 140° F. The temperature rises sharply to 155° F. between the top of the tower and the plate on which the solvent is admitted through line 39, then very slowly rising to 160° F. at the plate where the side stream is withdrawn through line 31. Below the plate from which the side stream is removed and as a result of the concentration of the aqueous acetone, the temperature rises sharply to 208° F. the temperature prevailing at the bottom of the tower. The temperature at the top of the side stream tower 30 is 145° F. In tower 30, the same type of temperature gradient is shown as in the concentrating section of the tower 20.

The isoprene-acetone-water azeotropic mixture removed as distillate from the tower 30 through line 37 is conducted to the water scrubbing equipment 40. Equipment 40 may be any suitable type of a liquid-liquid contacting device, in which countercurrent flow of the materials may be maintained. In the present case, the tower is packed with Raschig rings and sufficient pressure is maintained on the tower to prevent vaporization of any of the materials passing through it. The stream removed from the system through line 37 is admitted to the bottom of the tower 40 through a distributing device and then allowed to flow upward countercurrent to a stream of water admitted to the tower through line 44.

In passing through the tower, the acetone is removed and the hydrocarbon is thus completely freed of the solvent employed in the extractive distillation. The quantity of water employed is determined by the partition of the solvent between the hydrocarbon and the water and the efficiency of the extracting equipment 40. For the specific composition taken, a volume ratio of water to distillate is approximately 1. Passing overhead from the tower 40 is partially purified isoprene in a high concentration. Impurities present in the stream consist of piperylene, cyclopentadiene, polymers and any other water insoluble materials contained in the distillate from the tower 30. The water extract removed from the tower through line 48 consists of a dilute solution of acetone in water. This extract is combined with a similar extract from the tower 50 and treated for the recovery of the acetone solvent as to be subsequently described.

The solvent-free diolefin concentrate from the tower 40 is conducted through line 46 to the fractionating tower 70. This tower may be any suitable device for effecting a fractional distillation. For the specific composition chosen, a tower containing 50 bubble cap plates is employed. The tower 70 is provided with an overhead vapor line 72, a condenser 73, a reflux drum 74, a reflux line 75 and a bottoms withdrawal line 76, a reboiler 78 and a reboiler vapor return line 79. The distillate product is withdrawn through line 81 and the bottoms product through line 77. Pressure is maintained on the system so as to effect satisfactory condensation with ordinary water in the condenser 73. In the specific example, pressure maintained upon the tower 70 is between 12 and 15 lbs. per sq. in. (gauge).

The distillate withdrawn through line 72 consists of highly purified isoprene containing traces of piperylene and pentenes. The distillate is condensed in equipment 73 and the condensate conducted to the reflux drum 74. A portion of condensate is returned to the tower 70 as reflux through line 75, while the remainder is withdrawn as product through line 81. It is cooled in equipment 80 and transferred to storage through line 82.

The bottoms consisting of the piperylene and cyclopentadiene, in addition to any polymer or high boiling constituents, of the feed to the tower and containing some isoprene, is withdrawn through line 76. A portion of the material is passed to the reboiler 78 where it is vaporized, the vapors being returned to the tower 70 through line 79 to supply the heat necessary to operate the tower. The remainder of the bottoms are removed through the line 77 and recycled to the feed tower 10 for the recovery of any isoprene content.

By increasing the number of plates in tower 70 or increasing the reflux ratio, essentially all of the isoprene may be taken overhead as purified product. It has been found, however, more efficient to reject a small amount of isoprene to the bottoms and recycle same for recovery as described. A reflux ratio of 12 is maintained for the desired separation in the tower 70.

The distillate fraction from the tower 20 which is withdrawn through line 41, containing the azeotropic mixtures of the $C_5$ paraffins and olefins is combined with any recycled solvent from the bottom of the tower 20 taken from line 27 which is withdrawn through line 43 to maintain the impurities in the solvent at a low value. In the example, about 3.5% of the solvent passing through line 27 is withdrawn and combined with the distillate material removed through line 41. The composite solution is then cooled in equipment 42 and carried to the water extraction tower 50 by means of the line 43. The extraction tower 50 is similar to the extraction tower 40. It is similarly packed with Raschig rings. The composite solution consisting of the $C_5$ olefins and paraffins, in addition to acetone and water, is introduced into the tower 50 near the bottom and passes upward through the tower countercurrently to a stream of water introduced near the top through line 45.

In passing through the tower, the solvent is extracted from the hydrocarbon material. Any polymers or other high boiling material in the portion of the recycled solvent which was combined with the distillate from tower 20 is extracted by the hydrocarbons of the distillate material. The hydrocarbons freed of solvent are removed through line 47 at the top of the tower 50 and discarded. The water extract consisting of a dilute solution of acetone in water is withdrawn through line 49 at the bottom of the tower 50 and after being combined with a similar extract from the tower 40 is transferred through line 51, through heat exchangers 52 and line 61 to the solvent recovery tower 60.

Tower 60 may be any convenient device for effecting fractional distillation, such as a tower containing about 20 bubble cap plates. It is provided with an overhead vapor line 62, a condenser 63, a reflux drum 64, reflux line 65, a bottoms withdrawal line 66 and a steam line 68. The distillate product is withdrawn through line 69 and the bottoms through line 67. The distillate from the tower 60 consists of relatively pure solvent. The tower is operated at about atmospheric pressure. The distillate vapor passes through line 62 to the condenser 63 and the condensate passed to reflux drum 64. A portion of the condensate is returned to the tower 60 through line 65, while the remainder is withdrawn and transferred through line 69 to line 39 where it combines with the solvent admitted to the tower 20. Heat is supplied to the tower 60 by means of a steam line 68 through which open steam is injected directly into the bottom of the tower. The bottoms comprising the major part of the water content of the feed and the condensed steam is withdrawn through line 66 to the heat exchanger 52. The heat exchanger 52 is utilized to heat the feed to the tower 60. Thus, the sensible heat of the bottoms is utilized.

The reflux returned to the tower 60 through line 65 is controlled at such a rate that the water content of the distillate passing through line 62 and consequently the product returned to the tower 30 through lines 69 and 39 is the same as the recycled solvent in tower 20. By proper adjustment of the reflux ratio in tower 60, the water content of the product may be varied to correct the variations in the water content of the solvent in the tower 20. Normally a reflux ratio of about 0.5 is maintained in the tower 60.

With the foregoing disclosure and illustration of the invention it will be obvious to those skilled in the art that various combinations and variations of the applications of the principle described and illustrated can be made without departing from the inventive concept and that the invention in the broad aspect comprises the unique combination of fractionally distilling and extractively distilling suitable feed stock materials for the separation of individual hydrocarbon compounds.

What is claimed is:

1. A process for separating isoprene from a refinery cracked stock containing isoprene which comprises subjecting said refinery cracked stock to distillation in the presence of aqueous acetone to obtain an azeotropic mixture containing isoprene as distillate material, subjecting said distillate material to an extractive distillation in the presence of a solvent comprising acetone, separating a distillate fraction containing isoprene in high concentration and fractionally distilling the resultant material to obtain isoprene.

2. A process according to claim 1 in which the solvent employed in the extractive distillation is aqueous acetone.

JOHN A. PATTERSON.